US006137998A

United States Patent [19]

Holshouser et al.

[11] Patent Number: 6,137,998

[45] Date of Patent: Oct. 24, 2000

[54] SHIELDING FOR RADIOTELEPHONES WITH RETRACTABLE ANTENNAS

[75] Inventors: Howard E. Holshouser, Efland; Robert A. Sadler, Durham, both of N.C.

[73] Assignee: Ericsson Inc., Research Triangle Park, N.C.

[21] Appl. No.: 08/994,419

[22] Filed: Dec. 19, 1997

[51] Int. Cl.[7] .................. H04B 1/03

[52] U.S. Cl. .................. 455/129; 343/702

[58] Field of Search .................. 455/127, 128, 455/129, 90, 575; 343/841, 851, 900, 901, 912, 702

[56] References Cited

U.S. PATENT DOCUMENTS

| | | | |
|---|---|---|---|
| 4,785,247 | 11/1988 | Meador | 324/338 |
| 5,089,829 | 2/1992 | Haruyama et al. | 343/852 |
| 5,335,366 | 8/1994 | Daniels | 455/89 |
| 5,343,213 | 8/1994 | Kottke | 343/702 |
| 5,389,938 | 2/1995 | Harrison | 343/702 |
| 5,412,393 | 5/1995 | Wieggenhorn | 343/702 |
| 5,434,582 | 7/1995 | Koike | 343/702 |
| 5,604,507 | 2/1997 | Openlander | 343/860 |
| 5,617,105 | 4/1997 | Tsunekawa | 343/702 |
| 5,635,943 | 6/1997 | Grunwell | 343/702 |
| 5,659,889 | 8/1997 | Cockson | 455/575 |
| 5,694,137 | 12/1997 | Wood | 343/702 |
| 5,856,808 | 1/1999 | Holshouser | 343/702 |

FOREIGN PATENT DOCUMENTS

| | | |
|---|---|---|
| 29808305U1 | 9/1998 | Germany . |

OTHER PUBLICATIONS

Patent Abstract of Japan, vol. 097, No. 08, (Aug. 29, 1997).
PCT International Search Report, International Application No. PCT/US98/26995.

*Primary Examiner*—Daniel S. Hunter
*Assistant Examiner*—Nick Corsaro
*Attorney, Agent, or Firm*—Myers Bigel Sibley & Sajovec, P.A.

[57] ABSTRACT

Shields for radiotelephones with a retractable antenna include a conductive tubular antenna guide operably associated with an electronic ground, and preferably configured to form an inductor or capacitor in a matching circuit operable when the antenna is in the retracted position. Associated methods include directing RF radiation produced by the antenna positioned internal to the radiotelephone along a longitudinal exit path out of the radiotelephone.

16 Claims, 3 Drawing Sheets

SHIELDING FOR RADIOTELEPHONES WITH RETRACTABLE ANTENNAS

FIELD OF THE INVENTION

The present invention relates to telephones, and more particularly relates to shielding used for minimizing interference between components in telephones with retractable antennas.

BACKGROUND OF THE INVENTION

Many radiotelephones employ retractable antennas, i.e., antennas which are extendable and retractable out of the radiotelephone housing. The retractable antennas are electrically connected to a signal processing circuit positioned on an internally disposed printed circuit board. Unfortunately, the close proximity of the retracted antenna to certain electronic components in the radiotelephone housing can cause a variety of operational problems. For example, errant noises or radiated energy can enter the receiver and degrade the performance of the radiotelephone. Further, the close proximity of a user's hand to the retracted antenna can affect the radiation pattern of the radiotelephone and cause undesirable de-tuning effects.

In order to optimally operate, the signal processing circuit and the antenna should be interconnected such that their respective impedances are substantially "matched". However, a retractable antenna by its very nature has dynamic components, i.e., components which move or translate with respect to the housing and the printed circuit board. As such, a retractable antenna does not generally have a single impedance value which complicates the matching system. Instead, the retractable antenna typically generates largely different impedance values when in an extended versus a retracted position. Therefore, it is preferred that the impedance matching system alter the antenna's impedance to properly match the terminal's impedance both when the antenna is retracted and extended. Thus, as is well known to those of skill in the art, radiotelephones with retractable antennas typically include matching circuits, one associated with the extended position and one with the retracted position. In the extended position, the antenna typically operates with a half-wave ($\lambda/2$) load. In this situation, the associated impedance may rise as high as 600 Ohms. In contrast, in the retracted position, the antenna rod generally operates with a quarter-wave ($\lambda/4$) load with an impedance typically near 50 Ohms. Therefore, when the antenna is in the extended position an L-C matching circuit may be needed or desired to match out the additional impedance.

The physical configuration of the matching network is further complicated by the miniaturization of the radiotelephone and the internally disposed printed circuit board. Many of the more popular handheld telephones are undergoing miniaturization. Indeed, many of the contemporary models are only 11–12 centimeters in length. Because the printed circuit board is disposed inside the radiotelephone, its size is also shrinking, corresponding to the miniaturization of the portable radiotelephone. Unfortunately, as the printed circuit board decreases in size, the amount of space which is available to support desired operational and performance parameters as well as to separate electronic components of the radiotelephone is generally correspondingly reduced. Therefore, it is desirable to utilize efficiently and effectively the limited space in the radiotelephone and on the printed circuit board.

In the past, a variety of shielding devices for electronic components have been described. Many of these shields include a base wall fastened to an electronic component and a lid which attaches to the base wall. For example, U.S. Pat. No. 5,354,951 to Lange, Sr. et al. illustrates a multiple piece-shielding device. Unfortunately, this type of shield may not protect the retracted antenna from the closely located and susceptible electronic components. Further, this type of device which includes multiple pieces, can leak, which in turn can allow energy, noise, or RF radiation to enter and overload the receiver. Additionally this type of shielding fails to address the undesirable radiation pattern described above.

OBJECTS AND SUMMARY OF THE INVENTION

In view of the foregoing, it is therefore an object of the present invention to shield the electronics from the retracted antenna in a way which minimizes degradation in the performance of the radiotelephone.

It is yet another object of the present invention to provide an economical, easy to assemble shield which minimizes performance degradation attributed to unwanted electromagnetic noise and radiated transmitter energy introduced into the receiver and which can improve the radiation pattern generated by the radiotelephone.

It is a further object of the present invention to provide a shield which is relatively compact and can be electrically incorporated into a matching circuit when the antenna is retracted.

These and other objects, advantages and features can be provided according to the present invention by a conductive (preferably metallized) antenna guide assembly, positioned inside the radiotelephone housing adjacent the circuit board, which shields, guides, and retains the retracted antenna therein. The length of the metallized guide can be varied and electrically connected to the matching circuit to act as an inductive or capacitive component.

In particular, a first aspect of the invention includes an antenna guide assembly which comprises a cylindrical antenna having a conductive core and an outer surface and including opposing first and second ends defining a central axis through the center thereof. The antenna guide assembly also includes an elongated cylindrical antenna guide radially aligned with the antenna along the central axis. The antenna guide is configured to receive the antenna therein. The cylindrical antenna guide has a non-conductive inner surface and a conductive outer surface, and the antenna retracts and extends in and out of the antenna guide such that when the antenna is retracted a major portion of the antenna is enclosed therein. Preferably, the antenna guide has opposing first and second ends positioned in the radiotelephone such that the antenna guide second end is spaced apart from the antenna first end and the antenna guide second end is operably associated with an electronic ground.

Advantageously, the electronic length of the antenna guide can be adjusted according to certain desired operational features. For example, for an electrical length of less than $\lambda/4$, the antenna guide can act as an inductor which can be electrically connected to the matching circuit. Similarly, where the antenna guide has an electrical length greater than $\lambda/4$, the antenna guide can act as a capacitor. Further, if the guide has an electrical length equal to $\lambda/4$, it can be grounded at the end such that it acts an open circuit relative to the matching network in the radiotelephone.

In a preferred embodiment, the antenna guide assembly is positioned inside a radiotelephone which includes an internally disposed printed circuit board and an electronic ground affixed to the printed circuit board. The antenna guide and the retracted antenna engage with the ground to provide an electric path for radiation generated internal to the radiotelephone, the path being along the guide around and apart from the antenna linear element.

An additional aspect of the present invention is directed to an antenna shield. The antenna shield comprises an elongated cylindrical tube with a non-conductive inner surface and a conductive outer surface. The cylindrical tube is configured to receive a major portion of a retracted radiotelephone antenna therein and the antenna shield is electrically connected to an electronic ground such that the tube defines an exterior conductive path which directs radiation longitudinally up along the outer surface of the tube and out of the end of a radiotelephone.

Yet another aspect of the present invention is a radiotelephone with a matching system. The radiotelephone includes a radiotelephone housing having a top and bottom and a printed circuit board operably associated with a signal feed therein. The radiotelephone also includes a matching circuit and an antenna guide disposed in the housing. The antenna guide has an opening therein with opposing first and second ends. The first end is positioned adjacent the top of the radiotelephone housing and the exterior surface of the second end is operably associated with the electronic ground. The radiotelephone also includes a longitudinally extending antenna adapted to be received in the antenna guide opening such that the antenna is free to retract and extend relative thereto. The antenna includes upper and lower electrical contacts such that when the antenna is retracted, the upper contact electrically communicates with the signal feed to define a first signal path, and when the antenna is extended, the lower contact electrically communicates with the matching circuit.

In a preferred embodiment, the antenna guide has a predetermined length, and is configured to define part of the matching circuit. It is also preferred that the antenna guide and the antenna be operably associated with an electronic ground when the antenna is retracted within the guide.

It is additionally preferred that the antenna guide be configured to form one of the radiotelephone matching circuit inductive and capacitive elements when the antenna is retracted. The capacitive or inductive state corresponds to the electrical length of the antenna guide as measured from the electronic ground position and the conductive length of the guide.

Another aspect of the invention is a method for propagating RF radiation from the antenna inside of a radiotelephone along a longitudinal path out of the radiotelephone. The radiotelephone includes a retractable antenna with a top load element. The method includes positioning a conductive tubular antenna guide inside a radiotelephone. The antenna is translated so that a major portion of the antenna is positioned inside the tubular antenna guide. The RF radiation generated from the antenna inside the radiotelephone is propagated along the antenna, the propagation directed by the antenna guide such that a substantial amount of the RF radiation is propagated along the antenna and out of the radiotelephone at the top load element. Preferably, the propagating step is carried out by containing the radiation within the antenna guide, along the length of the antenna guide to the antenna element, thus providing a longitudinal radiation path. Also preferably, the antenna guide is electronically engaged as a component in a matching circuit positioned in the radiotelephone when the antenna is retracted. Advantageously, the RF radiation path defined by the shield and the antenna provide a more efficient radiotelephone radiator.

Advantageously, the present invention employs a relatively inexpensive, easy to assemble metallized elongated shield to guide and retain the antenna inside the telephone as well as to protect internal circuitry from such things as noise and radiation which can causing undesirable operational performance. Further, this type of design can direct internally generated radiation along an improved RF radiation discharge path out of the radiotelephone and can even be used to form part of a matching network in the radiotelephone.

The foregoing and other objects and aspects of the present invention are explained in detail in the specification set forth below.

DESCRIPTION OF PREFERRED EMBODIMENTS

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. Layers may be exaggerated for clarity.

In the application, certain terms have been used to describe the positional relationships of certain of the features. As used herein, the term "longitudinal" and derivatives thereof refer to the general direction defined by the longitudinal axis of the radiotelephone housing including that associated with an antenna that extends upwardly and downwardly between opposing top and bottom ends of the radiotelephone when held in the hand of a user. As used herein, the terms "outer", "outward", "lateral" and derivatives thereof refer to the direction defined by a vector originating at the longitudinal axis of the radiotelephone and extending horizontally and perpendicularly thereto. Conversely, the terms "inner", "inward", and derivatives thereof refer to the direction opposite that of the outward direction. Together the "inward" and "outward" directions comprise the "transverse" direction.

Figure 1:
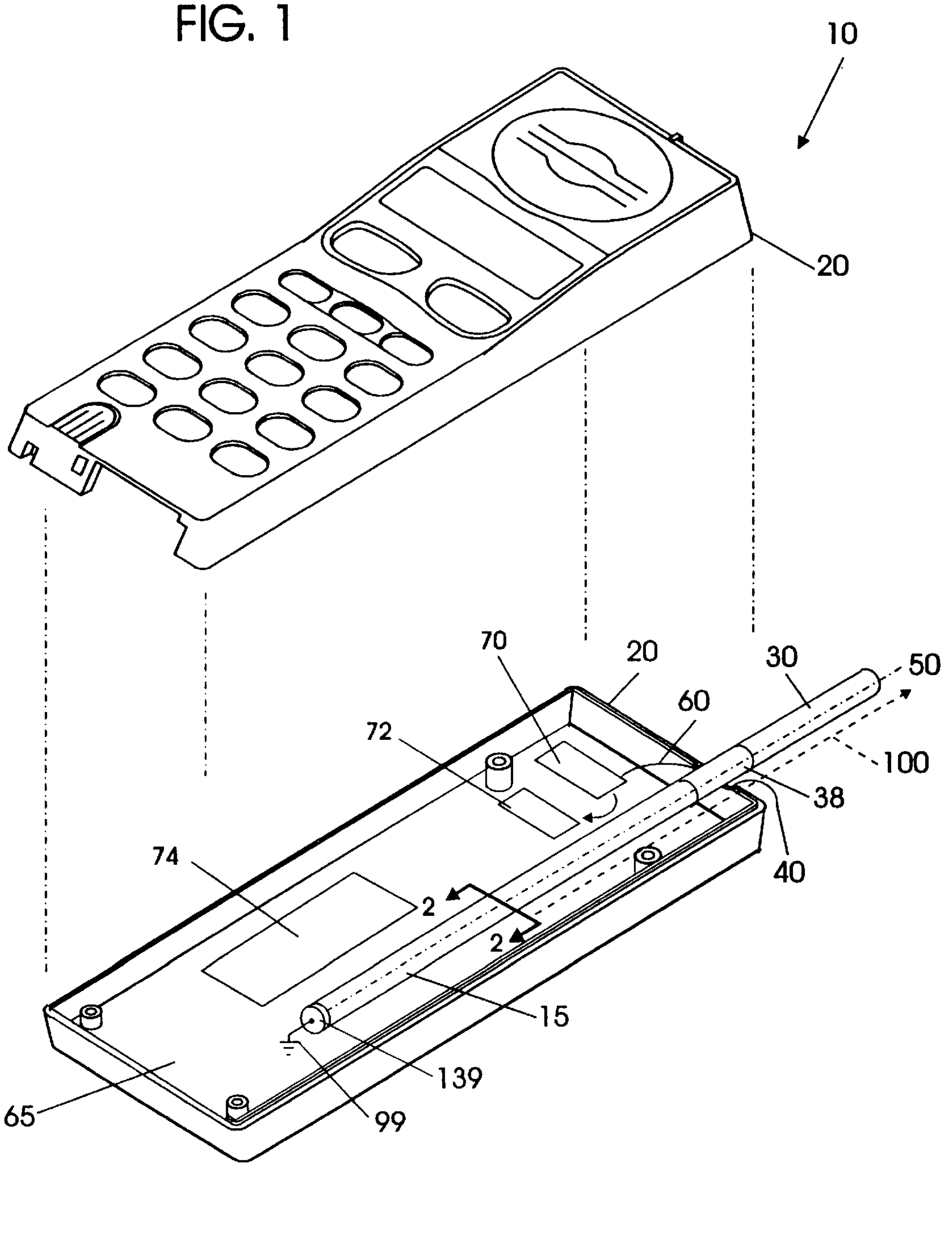
FIG. 1 is a cutaway perspective view of a radiotelephone with an antenna shield according to the present invention.

Referring now to the drawings, FIG. 1 illustrates a preferred embodiment of a radiotelephone 10 with an antenna shield 15 positioned in a radiotelephone housing 20 according to the present invention. The radiotelephone 10 includes a retractable antenna 30 sized and configured to be received in an opening 45 (FIG. 3) in the antenna shield 15. Preferably, the antenna 30 is radially aligned with the shield 15 along a central axis 50 (the axis is defined by a line extending between the opposing ends of the antenna 30) (FIG. 1). Thus, the antenna 30 is free to translate in and out of the shield 15 along the central axis 50 corresponding to the retraction and extension of the antenna relative to the radiotelephone housing 20.

As shown in FIG. 1, the radiotelephone 10 also includes a signal feed 60 operably associated with the printed circuit board 65. The signal feed 60 feeds the signal from and to the antenna, i.e., into and out of the radiotelephone. Preferably, as will be appreciated by those of skill in the art, the printed circuit board 65 is configured to receive (and transmit) an electrical signal via the antenna 30 through a single feed point 60.

Figure 3:
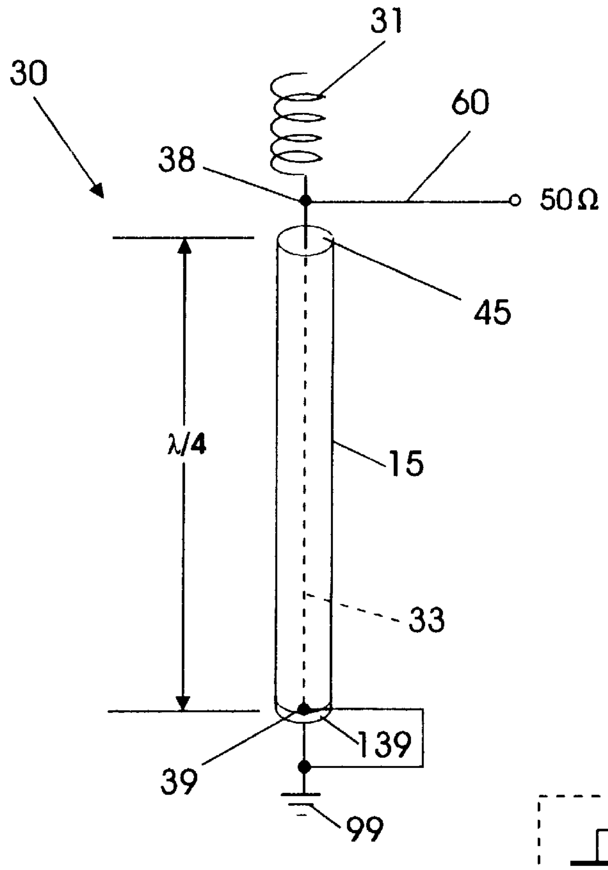
FIG. 3 is a schematic view of an antenna assembly according to one embodiment of the present invention.

In a preferred embodiment, as shown in FIG. 3, the antenna 30 includes conductive top and bottom contacts 38, 39. The top contact 38 is operably associated with the signal feed 60 when the antenna 30 is retracted. Similarly, the bottom contact 39 is operably associated with the signal feed 60 when the antenna 30 is extended (typically via a matching circuit as will be discussed further below). The signal feed 60 connects the antenna 30 to certain components or circuitry on the printed circuit board 65.

FIG. 1 illustrates some of the components which generate (or can be undesirably affected by) noise, radio frequency ("RF") radiation, and the like. The items shown include a duplexer 70, a receiver 72, a logic section 74, and the retracted antenna element 33 (FIG. 3) (if unshielded). Thus, as shown the retractable antennas are positioned relatively close to sensitive electronics. The instant invention recognizes that performance problems can arise from the close proximity of the retracted antenna to certain of the components, and therefore provides a conductive shield for the antenna itself. This design advantageously provides two-way protection. That is, in operation, the instant invention provides a conductive shield which protects the electronics from the antenna's radiation and also precludes or minimizes radiation generated from the electronics from entering into the antenna rod 33. For example, in conventional radiotelephones the retracted antenna element 33 can radiate transmitter energy internally such that it leaks around the duplexer 70 and enters into the receiver 72 front end potentially causing overload and interfering with reception. Similarly, electromagnetic noise from the telephone logic section 74 has spectral components which can also interfere with reception. Additionally, even if these components use conventional electronic housing type shields as described above, any leakage from the shield or from unshielded components can find its way into the retracted antenna element.

Figure 2:
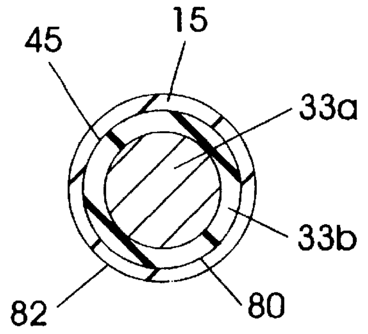
FIG. 2 is a section view of the section taken along line 2—2 in FIG. 1.

Preferably, as schematically illustrated in FIG. 3, the antenna 30 is configured as a top load monopole element (such as a helix 31) connected to a linear rod element 33. As shown in FIG. 2, the linear element 33 typically includes a conductive core 33*a* with a non-conductive outer surface 33*b*. Preferably, the antenna 30 is configured to operate as a half wave in the extended position and a quarter wave in the retracted position. However, as is well known to those of skill in the art, the antenna 30 can be alternatively configured. Thus, although described as a top loaded monopole that operates as a half wave in the extended position and a quarter wave stub (via the helical spiral 31) in the retracted position, the invention is not limited to this antenna load or configuration as alternative antenna configurations can also be employed in the instant invention. For example, an antenna load with an integer multiple of a half-wavelength, or a coil, disc or other type antenna load element.

In a preferred embodiment, the electrical length of the antenna 30 (typically defined by the top load element 31 and the length of the linear rod 33) is predetermined. Further preferably, the electrical length of the antenna 30 is configured to provide a half wavelength or an integer multiple of a half wavelength so that the antenna 30 resonates with the operation frequency. As also shown in FIG. 1, the antenna shield 15 preferably includes a bottom contact 139 which is operably associated with an electronic ground 99.

It will be appreciated that when the antenna 30 is extended, a major portion of the antenna body is outside of the housing 20; in contrast, when the antenna 30 is retracted, a major portion of the antenna 30 is positioned inside the shield 15 held in the radiotelephone housing 20. In operation, the antenna rod 30 extends in and out of the housing passage 40 and the aligned shield opening 45 along the central axis 50. Thus, the antenna 30 engages with the housing 20 such that different circuit paths are defined and activated by the position of the antenna 30 with respect to the signal feed 60 positioned in the housing 20. Stated differently, the antenna 30 engages first and second signal paths corresponding to the retraction and extension of the antenna as will be discussed in more detail below.

Referring to FIG. 2, a section view taken along lines 2—2 in FIG. 1 illustrates the antenna linear element 33 received into the antenna shield opening 45. The linear element or rod 33 is preferably radially aligned with and surrounded by the antenna shield 15. The antenna shield opening 45 preferably has a nonconductive inner wall surface 80 and a conductive outer surface 82. Alternatively, an intermediate surface (not shown) positioned away from the antenna rod core 33*a* can be conductive. The non-conductive inner surface helps prevent inadvertent shorting with the antenna rod while the conductive outer surface 82 provides the columnated conductivity which shields and directs radiation along a desired radiation exit path 100 (FIG. 1).

Figure 5:
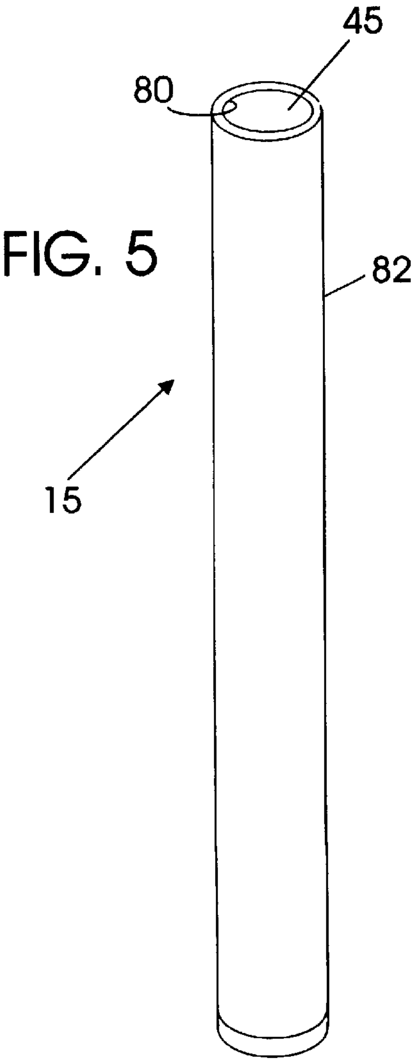
FIG. 5 is an enlarged perspective view of an antenna shield according to the present invention.

As shown by FIGS. 1, 2 and 5, the conductive outer surface 82 retains, transmits, or shields the radiation or current depending on the origination of the radiation energy. That is, radiation attributed to the retracted antenna core element 33 is largely contained within the shield 15 and propagated to exit at desired positions: radiation from the logic section 74 of the radiotelephone is directed away from the antenna rod 33 and onto the conductive outer to ground. Each of the types of radiation (digital or RF) thus are desirably directed about or within the antenna shield. Preferably, the RF radiation (at the operating frequency of the radiotelephone such as 800 MHz) is propagated along a desired radiation path 100 which is a longitudinal path which extends along the length of the antenna shield 15 and out of the radiotelephone housing 20. Preferably, the radiation is directed out and to the top of the top element 31 of the antenna. Accordingly, RF radiation is advantageously directed up and out of the top of the telephone (and away from the transverse direction which is typically closer to a user) and the phone and antenna 30 act as a more efficient radiator with the shield 15 when the antenna is retracted.

Figure 4:
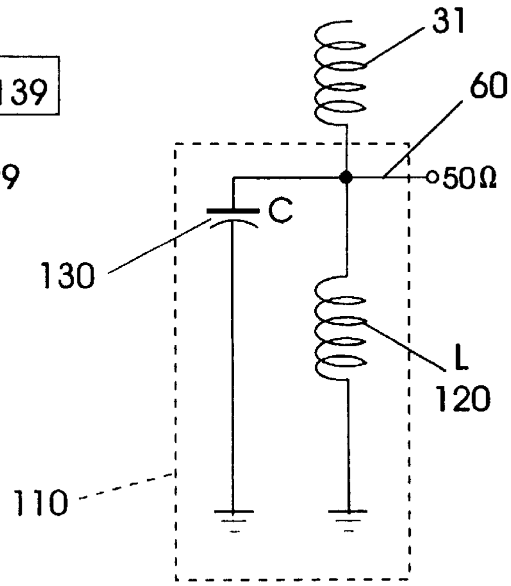
FIG. 4 is a schematic of a matching circuit according to the present invention.

FIG. 3 illustrates a preferred embodiment of the antenna 30 retracted into the antenna shield 15. As schematically shown, the antenna 30 rod end opposite the helix 31 is operably associated with an electrical ground 99 when the antenna is retracted. The stationary antenna shield 15 is also preferably connected to an electrical ground 99 at a bottom portion of the shield. Together the rod 33 and shield 15 then form a coaxial transmission line. When both are grounded and when the length of the shield/rod is a quarter wavelength, the impedance reflected to the antenna feed 60 is very large (i.e., essentially acts as an open circuit). However, the electrical length of the antenna shield 15 can vary. The length is preferably such that the shield 15 can be used to form part of the matching circuit (FIG. 4, 110). As shown in FIG. 3, it is also preferred that the rod end electrical contact 39 electrically engage with the shield contact 139 to contact the ground 99 when the antenna 30 is retracted therein.

Radiotelephones having matching and switching systems are well known to those of skill in the art. Examples of suitable systems include that described in a co-pending patent application, Ser. No. 08/858,982, filed May 20, 1997, entitled "Radiotelephones with Antenna Matching Switching System Configurations" by Gerard J. Hayes and Howard E. Holshouser. An additional alternative is described in a co-pending application, Ser. No. 08/841,193, filed Apr. 29, 1997, entitled "Radiotelephones with Integrated Antenna Matching Systems" by Howard E. Holshouser. Matching circuits are typically used when the antenna is extended, but may also be used to help improve the matching when the antenna is retracted. In the present invention, the antenna shield 15 can form part of a matching network which is operative when the antenna is retracted. In contrast, the antenna shield 15 is preferably not in the signal circuit at all when the antenna is extended.

Figure 4A:
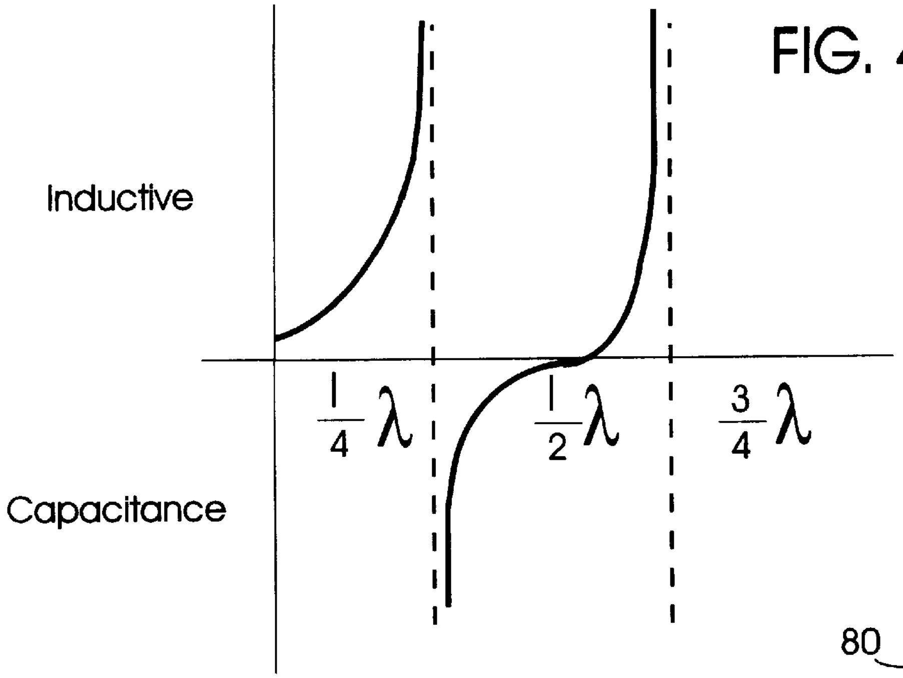
FIG. 4A is a graphical representation of the impedance associated with the electrical length of the antenna guide.

As shown in FIG. 4, the retracted matching circuit 110 includes inductive 120 and capacitive 130 components. The instant invention can vary the length of the shield 15 such that it can act as an inductive or capacitive component which can then advantageously be electrically connected to form part of a matching circuit when the antenna 30 is retracted. More specifically, as indicated by FIG. 4A, the electrical length of the shield 15 (indicated by the ¼ wave ("λ"), ½ λ, and ¾ λ, marks) defines the inductive or capacitive property of the shield 15 and thus its use in the matching circuit 110. FIG. 4A graphically illustrates the tangential function mathematically representing the change from inductive (above x-axis) to capacitive state (below x-axis) depending on the electrical length of the shield 15 forming the coaxial transmission line.

Figure 5A:
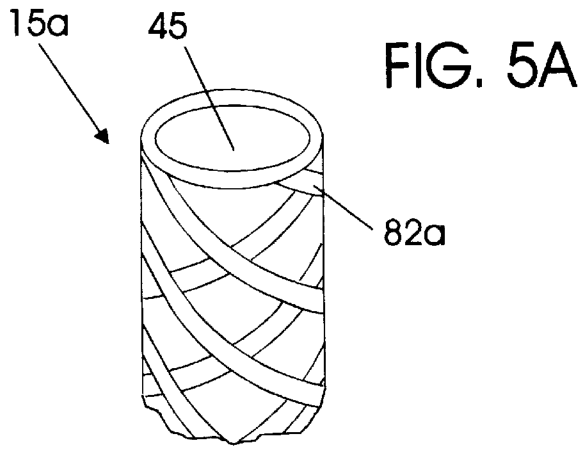
FIG. 5A is a partial view of an additional embodiment of the antenna shield in FIG. 5.

In a preferred embodiment, the antenna shield 15 outer surface is metallized to form a conductive outer surface 82. The antenna guide 15 can be metallized in any number of ways, for example but not limited to, by plating such as with a silver over zinc plating material, by using a copper foil, or by using a braided sleeve over a non-conducting substrate or polymer material (FIG. 5A). It is also preferred that the metal plating be 4–5 skin depths deep. One of skill in the art will understand that the "skin" depth is dependent on the resistivity of the underlying material and the operating frequency of the radiotelephone. This type of depth or plating thickness should be sufficient to provide low impedance to high frequency currents.

Operationally, in a preferred embodiment, the antenna 30 and the signal feed 60 define first and second signal paths corresponding to the extension and retraction of the antenna. Referring to FIG. 3, the first signal path is engaged when the antenna is retracted. This signal path is defined by the top load element 31, the upper antenna contact 38, the matching circuit (FIG. 4) and the signal feed 60. The second signal path is engaged when the antenna is extended. The second signal path is defined by the top load element 31, the linear rod 33, the lower contact 39, and the signal feed 60.

It is also preferred that the antenna shield 15 be configured so as to enclose the antenna rod element 33 when in the retracted position. In this embodiment, the top of the shield is in close proximity to the radiotelephone housing 20 at the antenna opening and continuously extends in down a distance sufficient to surround the antenna element when it is retracted. Preferably, the bottom end of the shield is enclosed by a conductive contact 139 positioned over the opening 45. Thus, the retracted antenna lower contact 39 can engage with the shield contact 139 and connect to the ground 99. By enclosing the rod element in the shield, propagation of RF radiation is more efficient because it is kept within the antenna shield and thus the antenna in a desired radiation path and any undesirable RF radiation paths (such as into other parts of the radiotelephone or transversely away from the rod) can be reduced.

Although the instant invention is described for use in a radiotelephone, the shield can also be conveniently adapted for use with other equipment, especially communication equipment and the like which operate with retractable antennas.

As used herein, the term "printed circuit board" is meant to include any microelectronics packaging substrate.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An antenna assembly, comprising:

an antenna having a top load element and a linear element, said linear element having a conductive core and an outer surface, said antenna including opposing first and second ends with corresponding first and second electrical contacts and defining a central axis through the center thereof;

an elongated cylindrical guide radially aligned with said antenna along the central axis, said antenna configured to receive said antenna therein, wherein said cylindrical guide has a non-conductive inner surface and a conductive outer surface and opposing first and second end portions, wherein said guide has a continuous perimeter surface away from said guide first end, and wherein said antenna retracts and extends in and out of said guide such that when said antenna is retracted a major portion of said antenna is enclosed therein; and a conductive element integrally attached to said cylindrical guide second end portion such that it provides a continuous perimeter therefor, wherein said conductive element is in electrical communication with an electrical ground, and wherein, when said antenna is retracted, said antenna first end electrical contact is operably associated with a signal feed contact and said antenna second electrical contact abuts said conductive element whereby said antenna and said cylindrical guide define a portion of an impedance matching circuit.

2. An antenna assembly according to claim 1, wherein said guide second end is spaced apart from said antenna first end when said antenna is retracted, and wherein said cylindrical guide first and second ends have openings formed therein, and wherein said conductive element is sized and configured to overlie and attach to and close said cylindrical guide second end, and wherein said conductive element is operably associated with an electronic ground.

3. An antenna assembly according to claim 1, in combination with a radiotelephone, said radiotelephone including an internally disposed printed circuit board and an electronic ground affixed to said printed circuit board, wherein said conductive element is configured as a disk which is axially aligned with said antenna guide and attached to said second end thereof wherein said antenna retracts into said cylindrical guide such that said antenna second electrical contact rests against said antenna guide conductive element and each thereby engage with said ground to provide a shield for radiation generated in the radiotelephone, and wherein when said antenna is extended, said cylindrical guide is electrically excluded from the signal circuit path.

4. An antenna assembly according to claim 3, wherein said guide has an electrical length less than $\lambda/4$.

5. An antenna assembly according to claim 3, wherein said guide has an electrical length greater than $\lambda/4$ .

6. An antenna assembly according to claim 3, wherein said guide has an electrical length equal to $\lambda/4$.

7. An antenna assembly according to claim 3, in combination with a radiotelephone, wherein said radiotelephone includes a matching circuit therein, and wherein said guide is electrically associated with said matching circuit as an inductive element when said antenna is retracted.

8. An antenna assembly according to claim 4, in combination with a radiotelephone, wherein said radiotelephone includes a matching circuit therein, and wherein said guide is electrically associated with said matching circuit as an inductive element when said antenna is retracted.

9. An antenna assembly according to claim 5, in combination with a radiotelephone, wherein said radiotelephone includes a matching circuit therein, and wherein said guide is electrically associated with said matching circuit as a capacitive element when said antenna is retracted.

10. An antenna assembly according to claim 7, wherein said radiotelephone includes a signal feed, and wherein said antenna and said signal feed define first and second signal paths such that said first signal path is operative when said antenna is retracted and said second signal path is operative when said antenna is extended, and wherein said first signal path electrically includes said cylindrical guide within said matching circuit to define a portion of said first signal path and said second signal path electrically excludes said cylindrical guide therefrom.

11. An antenna shield for an antenna configured to be retracted and extended from a wireless telephone, the antenna being electrically connected to the wireless telephone such that it has a signal path therebetween, the antenna shield comprising:

an elongated cylindrical tube having a first and second ends and a wall longitudinally extending therebetween, said wall having a non-conductive inner surface and a conductive outer surface and is configured to define an antenna passage therein; and a conductive element attached to an end portion of said elongated cylindrical tube, said conductive element sized and configured to close said antenna passage on said second end, wherein said elongated cylindrical tube and conductive element are configured to provide a continuous perimeter surface away from said elongated cylindrical tube first end, wherein said cylindrical tube passage is configured to receive a major portion of a retracted radiotelephone antenna therein, and wherein said tube is configured to be electrically connected to an electronic ground such that said tube defines an exterior conductive path which directs radiation longitudinally along the outer surface of said tube and out of the end of a radiotelephone and forms a portion of the signal path when the antenna is retracted, and wherein said tube is electrically excluded from the signal path when the antenna is extended.

12. A radiotelephone with a matching system comprising:

a radiotelephone housing having a top and bottom;

a printed circuit board operably associated with a signal feed and a matching circuit disposed in said housing;

a conductive antenna guide disposed in said radiotelephone housing, said antenna guide having opposing first and second ends and an antenna passage having a non-conductive surface therein, said first end positioned adjacent the top of said radiotelephone housing, said second end exterior surface being operably associated with the electronic ground, wherein said first end is open to allow said antenna free passage in and out thereof and said second end is closed, and wherein said conductive antenna guide has a perimeter which is continuous away from said guide first end; and a longitudinally extending antenna adapted to be received in said antenna guide passage such that said antenna is free to retract and extend relative thereto, said antenna including upper and lower electrical contacts, wherein when said antenna is retracted said upper contact electrically communicates with said signal feed and said matching circuit and said antenna lower contact is in electrical communication with said antenna guide second end electronic ground to define a first signal path which electrically includes said conductive antenna guide, and when said antenna is extended said lower contact electrically communicates with said signal feed to define a second signal path which substantially excludes said conductive antenna guide.

13. A radiotelephone according to claim 12, wherein said antenna guide has a predetermined length, and wherein said antenna guide is configured to define part of said matching circuit when said antenna is retracted, and wherein a portion of said antenna guide second end is conductive and when said antenna is retracted said antenna lower contact rests thereagainst such that each are electrically connected to the electrical ground.

14. A radiotelephone according to claim 12, wherein said antenna guide is configured with an axially aligned disk-shaped conductive portion which defines said conductive guide second end and which is electrically connected to ground, and wherein said antenna lower contact is configured to abut said antenna guide conductive portion in the axial direction when said antenna is retracted within said guide, and wherein both are thereby operably associated with the electronic ground.

15. A radiotelephone according to claim 14, wherein said matching circuit includes inductive and capacitive components, and wherein said antenna guide defines one of an inductive component and a capacitive component having corresponding inductive or capacitive states in said matching circuit when said antenna is retracted, the capacitive or inductive state corresponding to the electrical length of the antenna guide as measured from the electronic ground associated with said guide and the conductive length of said guide.

16. A method for fabricating a radiotelephone with an antenna shielded from RF radiation in a manner which can direct the RF radiation along a longitudinal path out of the radiotelephone, comprising the steps of:

positioning a conductive tubular antenna guide sized with a length to provide a preselected input to a matching circuit inside a radiotelephone having a retractable antenna with a top load element and spaced apart upper and lower electrical contact portions, the antenna guide being sized and configured to allow the retractable antenna to retract therein, the antenna guide having a non-conductive inner surface and a closed lower end defined by a conductive cap positioned thereon, wherein the antenna guide has a continuous perimeter surface away from the end configured to allow the retractable antenna therein;

retracting the antenna within the conductive tubular antenna guide so that the lower electrical contact portion of the antenna slides axially inwardly to reside against the conductive cap to connect the conductive cap and the lower electrical contact portion of the antenna to an electric ground;

locating the upper antenna contact portion on the antenna such that it extends above the conductive tubular antenna guide and contacts a signal feed in response to said retracting step; and electrically engaging the antenna guide as a component in a matching circuit positioned in the radiotelephone when the antenna is retracted.

* * * * *

UNITED STATES PATENT AND TRADEMARK OFFICE

CERTIFICATE OF CORRECTION

PATENT NO. : 6,137,998
DATED : October 24, 2000
INVENTOR(S) : Howard E. Holshouser and Robert A. Sadler It is certified that error appears in the above-identified patent and that said Letters Patent is hereby corrected as shown below:

Title page,
U.S. PATENT DOCUMENTS,

| | | | |
|---|---|---|---|
| 4,370,515 | 1/1983 | Donaldson | 174/35 |
| 4,754,101 | 6/1988 | Stickney et al. | 174/35R |
| 4,857,668 | 8/1989 | Buonanno | 174/35GC |
| 5,354,951 | 10/1994 | Lange, Sr. et al. | 174/35R |
| 5,374,937 | 12/1994 | Tsunekawa et al. | 343/702 |
| 5,508,889 | 4/1996 | Li | 361/816 |
| 5,583,519 | 12/1996 | Koike | 343/702 |

OTHER PUBLICATIONS,

"Announcing Printed Circuit Board Shielding from Instrument Specialties...an economical solution to your board level emission problems," New Product Bulletin (Series 97-2000), Instrument Specialties, 4 pages.

"CHO-SHIELD® EMI Shielding Covers," Technical Bulletin, Chomerics, Inc. (1996), 2 pages.

"STYLE CBS Circuit Board Component SHIELDING," Guide 96, *Leader Tech*, pp. 1-6.

Signed and Sealed this

Fifth Day of February, 2002

*Attest:*

JAMES E. ROGAN

*Attesting Officer*

*Director of the United States Patent and Trademark Office*